United States Patent
Dilip et al.

(10) Patent No.: US 6,704,409 B1
(45) Date of Patent: *Mar. 9, 2004

(54) METHOD AND APPARATUS FOR PROCESSING REAL-TIME TRANSACTIONS AND NON-REAL-TIME TRANSACTIONS

(75) Inventors: Venkatachari Dilip, Cupertino, CA (US); Janardhanan Jawahar, San Jose, CA (US); Murali Vaidyanthan, Fremont, CA (US)

(73) Assignee: Aspect Communications Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,263

(22) Filed: Dec. 31, 1997

(51) Int. Cl.[7] .................................................. H04M 5/00
(52) U.S. Cl. ............. 379/265.02; 379/243; 379/265.01; 379/265.09; 379/309; 379/266.01
(58) Field of Search .............................. 379/93.24, 265, 379/266, 309, 120, 93.17, 243, 265.09, 266.01, 266.02; 705/27; 713/201

(56) References Cited

U.S. PATENT DOCUMENTS

| | | | | |
|---|---|---|---|---|
| 5,793,861 A | * | 8/1998 | Haigh | 379/266 |
| 5,825,869 A | * | 10/1998 | Brooks et al. | 379/265 |
| 5,982,873 A | * | 11/1999 | Flockhart et al. | 379/266.01 |
| 6,012,144 A | * | 1/2000 | Pickett | 713/201 |
| 6,058,435 A | * | 5/2000 | Sassin et al. | 709/331 |
| 6,182,059 B1 | * | 1/2001 | Angotti et al. | 706/45 |
| 6,263,066 B1 | * | 7/2001 | Shtivelman et al. | 379/266.06 |

* cited by examiner

*Primary Examiner*—Bing Bui
(74) *Attorney, Agent, or Firm*—Blakely, Sokoloff, Taylor & Zafman LLP

(57) ABSTRACT

A transaction control system is capable of receiving both real-time transactions and non-real-time transactions. The control system processes the received transactions using a transaction controller, which is capable of processing both real-time transactions and non-real-time transactions. The control system is also capable of identifying a transaction type associated with the received transaction and assigning a priority to the received transaction. Real-time transactions may be assigned a higher priority than non-real-time transactions. The control system can also associate a Quality of Service (QOS) with each received transaction. The control system is capable of queuing a received transaction in a transaction queue if no agents are available to process the received transaction. A highest priority transaction is removed from the transaction queue when an agent becomes available to process a new transaction.

34 Claims, 9 Drawing Sheets

METHOD AND APPARATUS FOR PROCESSING REAL-TIME TRANSACTIONS AND NON-REAL-TIME TRANSACTIONS

FIELD OF THE INVENTION

The present invention relates to transaction processing systems. More specifically, the invention provides a system capable of controlling both real-time transactions and non-real-time transactions handled by a transaction processing system.

BACKGROUND

Various types of systems are available for processing transactions. Call processing systems, such as automatic call distributors (ACDs), are available for processing incoming and outgoing telephone calls. A telephone call is an example of a real-time transaction. For example, a customer may initiate a telephone call to a company's call processing system. The call processing system receives the incoming call and processes the call in various manners. The call may be routed to a telephone agent (e.g., a customer service agent) to answer the call and assist the customer. If all agents are busy, the call processing system may provide a recorded message to the customer explaining that all agents are busy, and place the call in a queue. Other call processing systems may provide an option to leave a message or listen to prerecorded answers to frequently asked questions.

Other types of transaction processing systems are able to handle electronic mail (e-mail) messages. An e-mail is an example of a non-real-time transaction. For example, a customer can e-mail a question or a request to a company's general e-mail address or a specific e-mail address associated with a particular department, product, or service. The e-mail is stored by the transaction processing system if an agent is not available to respond to the e-mail when received. Since e-mail messages do not generally require an immediate response (as with telephone calls), they are easily stored and answered at a later time. Responses to stored e-mail messages may be generated in the order the e-mail messages were received. E-mail responses may be generated any time an agent is available, regardless of the time of day or the day of the week. Thus, although a majority of e-mail messages may be received during regular business hours, responses can be generated at any time.

Known transaction processing systems typically assign each agent to handle a single type of transaction, such as incoming telephone calls. Since telephone call processing systems generally attempt to answer received telephone calls within a relatively short period of time (e.g., within a few minutes), an adequate number of telephone agents must be assigned to handle the volume of incoming calls. The number and rate of incoming telephone calls at a particular time may vary significantly. Therefore, the call processing systems must have enough agents available to handle, within a reasonable period of time, all incoming telephone calls. If the call processing system is staffed with enough agents to adequately handle peak call volumes, then the system may be overstaffed during non-peak times. Thus, certain agents may be idle for significant periods of time if the incoming call volume is below peak levels. Idle agents are expensive and reduce the overall efficiency of the call processing system.

Existing systems are able to change the status of an agent (e.g., from handling incoming telephone calls to handling outgoing telephone calls, or from handling incoming telephone calls to answering e-mail). In these systems, an agent is typically logged out of one transaction processing system and logged into a different system. For example, an agent may be logged out of a call processing system and logged into an e-mail processing system. These existing systems handle the changing of agent assignments by manually instructing one or more agents to log out of one system and log into another system. This manual instruction is typically provided by a supervisor or other individual responsible for monitoring the assignment of agents. For example, if a supervisor notices that several agents have been idle for a significant period of time, the supervisor may instruct several agents to stop handling incoming telephone calls and begin responding to received e-mails or facsimiles. Therefore, these existing systems require a supervisor or other individual to manually instruct agents to change from handling one type of transaction to another.

It is therefore desirable to provide an automated system that is capable of controlling both real-time transactions and non-real-time transactions, and capable of providing the highest priority transaction to an available agent.

SUMMARY OF THE INVENTION

The present the invention is related to a system capable of controlling both real-time transactions and non-real-time transactions. Embodiments of the invention provide a transaction controller that allows a particular agent to handle multiple types of transactions through a centralized control system. Thus, when an agent is available to receive a transaction, the highest priority transaction, of any type, is provided to the agent.

A particular embodiment of the invention provides a system for processing transactions. The system receives a transaction, which may be a real-time transaction or a non-real-time transaction. The received transaction is processed by a transaction controller, which is capable of processing both real-time and non-real-time transactions.

Other embodiments of the invention assign a priority to the received transaction, such that real-time transactions are assigned a higher priority than non-real-time transactions.

An embodiment of the invention associates a Quality of Service (QOS) with the received transaction.

Another embodiment of the invention queues the received transaction in a transaction queue if no agents are available to process the received transaction. A highest priority transaction is removed from the queue when an agent becomes available to process a new transaction.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1:
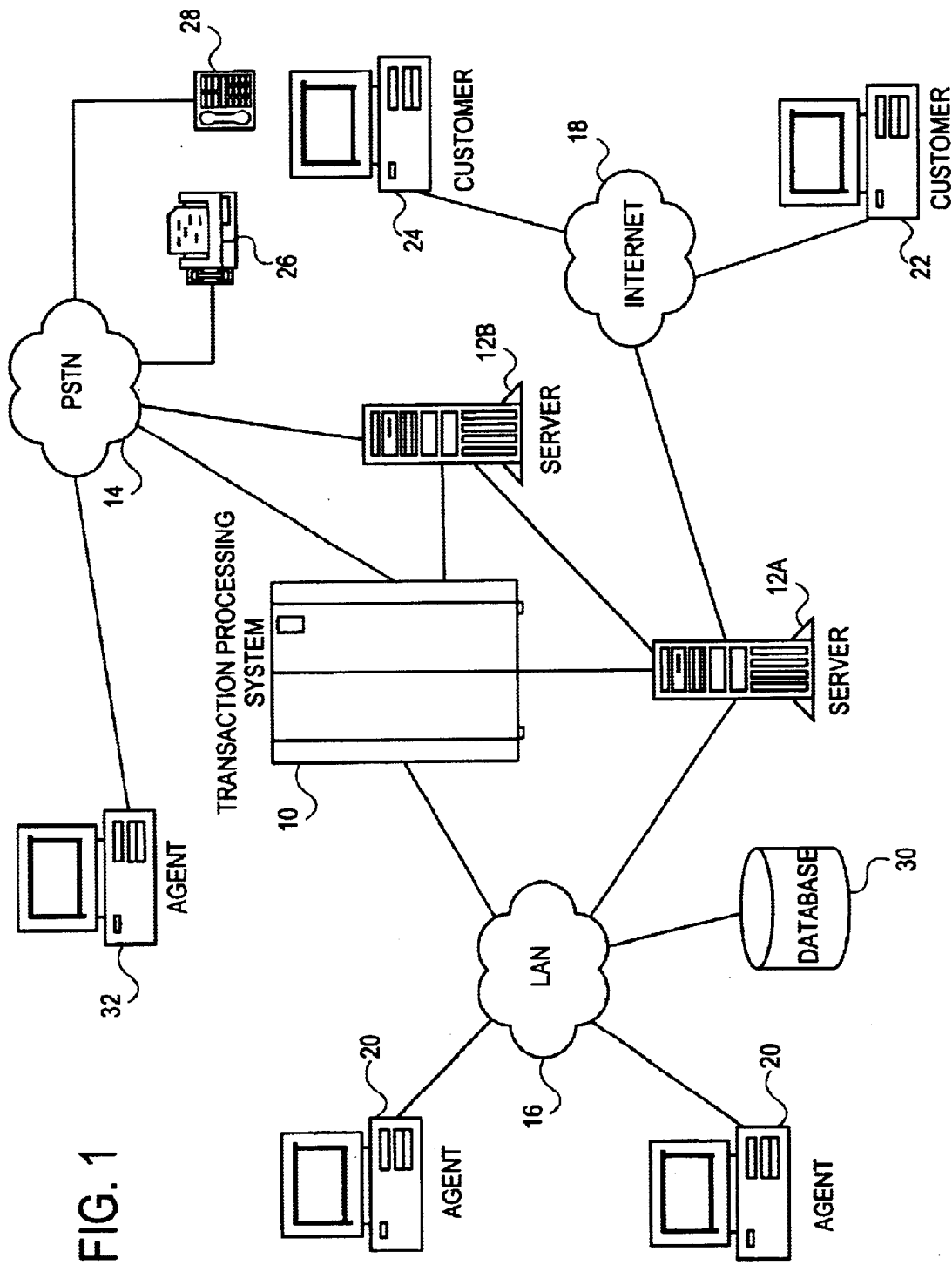
FIG. 1 illustrates an embodiment of a transaction processing environment in which the present invention may be used.

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present the invention is related to a system capable of controlling both real-time transactions and non-real-time transactions. Embodiments of the invention provide a transaction controller that handles multiple types of transactions from multiple sources. Some of the transactions may be processed by a transaction processing system. The transaction controller performs various control operations, such as monitoring transactions and transaction queues, analyzing transaction content, and monitoring Quality of Service (QOS) requirements. Particular embodiments of the invention automatically generate a response to particular types of transactions and communicate the response to an appropriate transaction server or transaction initiator. Other embodiments allow a particular agent to handle multiple types of transactions through a centralized control system. Thus, when an agent is available to receive a transaction, the highest priority transaction, of any type, is provided to the agent. This provides greater flexibility in scheduling agents and reduces the possibility that an agent will be idle for a significant period of time. Furthermore, supervisors are not required to manually switch agents from handling one type of transaction to another, because the transaction controller handles transaction selection automatically.

Particular embodiments of the invention are described below with reference to a transaction processing environment. Exemplary transactions include telephone calls, facsimile transmissions, electronic mail (e-mail), video sessions, or an Internet session. Particular transactions may be referred to as "real-time" or "non-real-time." A real-time transaction is a transaction in which signals are communicated between a transaction initiator (e.g., a customer) and an agent with relatively short time intervals between the termination of one transmission and the start of the next. Examples of real-time transactions include telephone calls, videoconferences, and Internet sessions (including Internet phone calls). A non-real time transaction is a transaction in which significant time may elapse (e.g., several hours) between the termination of one transmission and the start of the next. Examples of non-real-time transactions include e-mail messages, voice mail messages, and facsimile transmissions. These non-real-time transactions are typically received by a transaction processing system or other device and stored for later response by an agent. The time period between receipt of the non-real-time transaction and generation of a response may be any time greater than a few seconds.

A particular transaction can be either inbound (received by the transaction processing system) or outbound (transmitted from the transaction processing system). Although particular embodiments of the invention are described for processing telephone calls and e-mail messages, those of ordinary skill in the art will appreciate that the teachings of the present invention can be applied to any type of transaction. Additionally, particular embodiments of the invention are discussed in which transactions are exchanged between agents and customers. However, the present invention may be applied to any transaction processing environment in which transactions are exchanged between two or more individuals or systems.

A transaction processing system is any device capable of receiving, transmitting, queuing, routing, or otherwise processing a transaction. A transaction processing system may handle mixed transactions (e.g., receive a telephone call and respond to the telephone call using e-mail). Example transaction processing systems include automatic call distributors (ACDs), call centers, and other telephone processing devices. The teachings of the present invention may be applied to any type of transaction processing system.

FIG. 1 illustrates an embodiment of a transaction processing environment in which the present invention may be used. The transaction processing environment of FIG. 1 allows transaction initiators (e.g., customers) to contact an agent (e.g., a customer service agent) using various types of transactions. Similarly, the transaction processing environment allows an agent to respond to a transaction using various types of transactions.

A transaction processing system 10 is coupled to servers 12a and 12b. Additionally, transaction processing system 10 is coupled to a public switched telephone network (PSTN) 14 and a local area network (LAN) 16. Transaction processing system 10 is capable of processing various types of transactions, such as telephone calls, electronic mail (e-mail), voice mail, and facsimiles. Transaction processing system 10 is capable of receiving transactions from PSTN 14, LAN 16, and servers 12a and 12b. Similarly, transaction processing system 10 is capable of transmitting transactions and transaction responses to PSTN 14, LAN 16, and servers 12a and 12b. For example, transaction processing system 10 can receive an incoming telephone call directly via PSTN 14. Another incoming telephone call may be received by server 12b and provided to transaction processing system 10. Similarly, an incoming e-mail may be a received from a server 12a or 12b, or from LAN 16. For example, an incoming e-mail may be received by server 12a from Internet 18. If necessary, server 12a then provides the e-mail to transaction processing system 10, as discussed below.

FIG. 1 illustrates two separate servers, 12a and 12b, capable of interacting with various components in the transaction processing environment. For example, server 12a may operate as both a web server and a video server such that all Internet-related transactions and video-related transactions are processed by server 12a. Similarly, server 12b may operate as an e-mail server, fax server, and a voice mail server such that all e-mail, fax, and voice mail transactions are handled by server 12b. Although not shown in FIG. 1, server 12b may also be coupled to LAN 16 and Internet 18.

LAN 16 may be any type of network, including an intranet network capable of communicating information between various nodes in the network. Further, LAN 16 may use any network topology and communicate data using any communication protocol. As shown in FIG. 1, multiple agents 20 are coupled to LAN 16. In a typical transaction processing system, hundreds or thousands of agents may be coupled to one or more LANs 16, which are coupled to transaction processing system 10. Alternatively, some or all of the agents 20 may be coupled directly to transaction processing system 10, rather than coupled through LAN 16. Although agents 20 are represented in FIG. 1 by a computer, a particular agent 20 may utilize any type of device or system that allows interaction between the agent and an initiator of the transaction (e.g., a customer). For example, an agent handling only telephone call transactions may only use a telephone system, without requiring a computer. Similarly, an agent handling only e-mail messages may require a computer system, but not a telephone. In a particular embodiment of the invention, each agent has a computer system and a telephone (which may be integrated into the computer system), such that the agent is capable of handling and responding to multiple types of transactions (e.g., telephone calls, e-mail, voice mail, and facsimiles).

An agent 32, shown in FIG. 1, is not coupled directly to LAN 16, but instead is coupled directly to PSTN 14. Agents 20, discussed above, are located locally to transaction processing system 10 or include an access mechanism such that they are able to connect to LAN 16. Agent 32 is a remote agent or otherwise unable to directly connect to LAN 16. For example, agent 32 may be working at a location geographically distant from transaction processing system 10, such as working at home or traveling. Thus, agent 32 connects with transaction processing system 10 using PSTN 14. Alternatively, agent 32 may connect with LAN 16 or transaction processing system 10 through Internet 18 or any other network or communication system.

A database 30 is also coupled to LAN 16 and is used by transaction processing system 10, agents 20 and 32, and servers 12a and 12b to store and retrieve various types of information. For example, database 30 may contain information about the transaction processing system, the performance of the system, and the agents and customers that use transaction processing system 10. Since database 30 is coupled to LAN 16, all agent computers, servers, and other devices coupled to LAN 16 are capable of storing and retrieving information from the database.

Although FIG. 1 illustrates two separate servers 12a and 12b, alternate embodiments of the invention combine the functions performed by servers 12a and 12b in a single server. Other embodiments of the invention include a separate server for each type of transaction supported by the transaction processing system. An example embodiment using separate servers for each type of transaction is illustrated and discussed below with respect to FIG. 2.

As shown in FIG. 1, Internet 18 is coupled to server 12a and customer computers 22 and 24. Customer computer 22 may include an Internet phone for establishing verbal communications between the customer and an agent across Internet 18. The customer using computer 24 has a telephone 28 and a fax machine 26 coupled to PSTN 14 and located near computer 24. Thus, the user of computer 24 may communicate with an agent of the transaction processing system using Internet 18 (e.g., using an Internet phone or e-mail application), fax machine 26, telephone 28, or any combination thereof. For example, customer 24 may generate and transmit an e-mail message across Internet 18 to server 12a. Server 12a then communicates the e-mail to transaction processing system 10, which provides the e-mail to a particular agent or group of agents for response. Agents may be grouped together based on area of expertise, company department, or type of support provided (e.g., sales or technical support). The agent responding to the e-mail can respond with another e-mail message or may respond by telephone, facsimile, or any other type of transaction supported by the transaction processing system.

Figure 2:
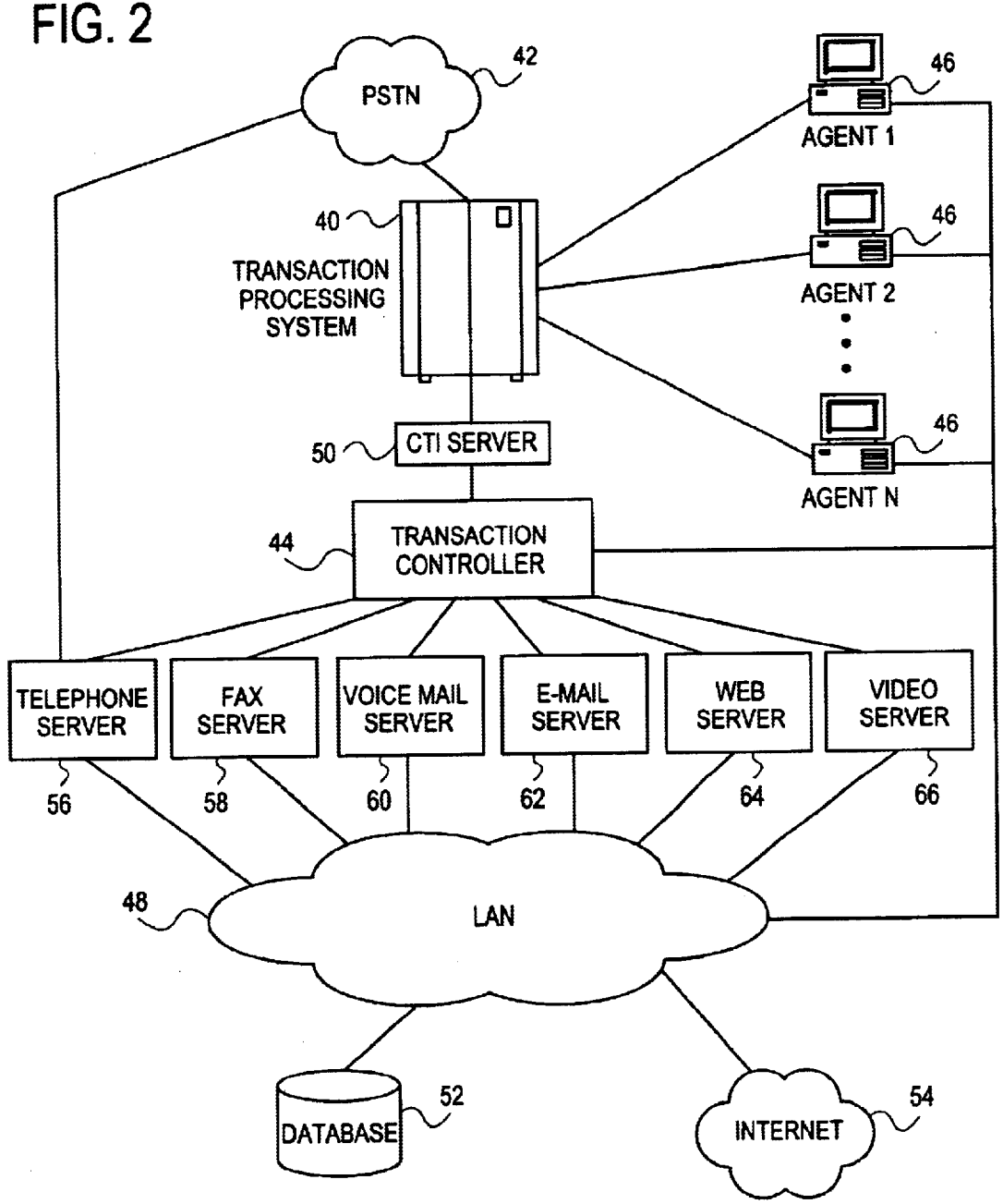
FIG. 2 illustrates an embodiment of a transaction processing environment including a central transaction controller and multiple transaction servers.

FIG. 2 illustrates an embodiment of a transaction processing environment including a transaction controller and multiple transaction servers. A transaction processing system 40 is coupled to a PSTN 42 and a computer-telephony integration (CTI) server 50. CTI server 50 is coupled to a transaction controller 44, and controls the flow of data between transaction processing system 40 and transaction controller 44. In alternate embodiments of the invention, CTI server 50 is contained within transaction controller 44 or transaction processing system 40, such that transaction processing system 40 is directly coupled to transaction controller 44. In other embodiments, transaction processing system 40, CTI server 50, and transaction controller 44 are coupled together via a network, such as a LAN. Multiple agents 46 are coupled to transaction processing system 40. As discussed above in FIG. 1, agents 46 are capable of handling various types of transactions, such as telephone calls, e-mail, facsimiles, and voice mail. Although agents 46 in FIG. 2 are directly coupled to transaction processing system 40, alternate embodiments couple agents 46 to transaction processing system 40 using a network (e.g., LAN 16 shown in FIG. 1).

Transaction controller 44 controls the overall processing of transactions by transaction processing system 40 and other processing devices (e.g., servers) coupled to transaction controller 44. Transaction controller 44 is capable of controlling the processing of both real-time transactions and non-real-time transactions. Transaction controller 44 manages one or more transaction queues and selects a highest priority transaction for processing when an agent becomes available. Additional details regarding the operation of transaction controller 44 are provided below.

Agents 46 are coupled to transaction controller 44 and a LAN 48, thereby allowing the agents to communicate with the various devices coupled to LAN 48. A database 52 is coupled to LAN 48 and stores various information used by the devices in the transaction processing environment. For example, database 52 may store system configuration information, customer information, and data regarding transactions handled by the system. LAN 48 is also coupled to Internet 54, thereby providing an Internet connection to all devices coupled to LAN 48.

A telephone server 56 is coupled to PSTN 42, transaction controller 44 and LAN 48. Since telephone server 56 is coupled to PSTN 42, it is capable of directly receiving and initiating telephone calls across PSTN 42. Other servers, including a fax server 58, a voice mail server 60, an e-mail server 62, a web server 64, and a video server 66 are also coupled to transaction controller 44 and LAN 48. These six servers 56–66 represent the six different types of transactions supported by the transaction processing environment shown in FIG. 2. Servers 56–66 may also be referred to as transaction servers. In alternate embodiments of the invention, other types of transactions may be supported, and appropriate servers are provided for those supported transactions. In the embodiment of FIG. 2, six separate servers are provided, one for each type of transaction supported by the transaction processing system. In alternate embodiments of the invention, any two or more servers may be combined together into a single server. For example, telephone server 56 and voice mail server 60 may be combined together into a single telephony server device. Furthermore, all six servers may be combined into a single server capable of handling all supported types of transactions. Further embodiments integrate one or more servers 56–66 into transaction controller 44, which itself may be integrated into transaction processing system 40.

Although not shown in FIG. 2, various servers may also be coupled directly to PSTN 42 or Internet 54, rather than via LAN 48. For example, fax server 58, and voice mail server 60 can be coupled directly to PSTN 42 such that they receive telephony signals directly from PSTN 42, rather than through transaction processing system 40. Similarly, web server 64 may be directly coupled to Internet 54, such that Internet data is provided directly between web server 64 and Internet 54, rather than communicating the data across LAN 48.

Telephone server 56 handles various types of incoming and outgoing telephone calls. These telephone calls include calls generated by a customer or other telephone call initiator as well as telephone calls generated by an agent (e.g., calling a customer or transaction initiator). Fax server 58 handles incoming and outgoing facsimiles. Voice mail server 60 provides various voice mail functions, such as providing recorded voice mail instructions and storing incoming messages in an appropriate voice mail box. The voice mail boxes may be associated with particular agents or groups of agents within an organization.

E-mail server 62 processes various incoming and outgoing e-mail messages. These e-mail messages include incoming messages from customers requesting information or help regarding a product or service. Additionally, the e-mail messages handled by e-mail server 62 can be generated by an agent when answering customer questions or providing information requested by a customer. Web server 64 handles various web transactions and other Internet-related messages and information. Web server 64 is also capable of handling Internet phone calls between an agent and a transaction initiator. Video server 66 handles various types of video sessions (such as videoconferences) and the exchange of various types of the video-based information.

The configuration shown in FIG. 2 allows a particular agent to handle multiple types of transactions in any order. For example, an agent may receive a telephone call, followed by an e-mail, which is followed by a facsimile. The agent receives the highest priority transaction each time the agent becomes available (i.e., logs into the system or completes the previous transaction), regardless of the transaction type. Agents are able to receive different types of transactions without changing groups or logging into a different transaction processing system. This provides better utilization of system resources because agents are available to handle the highest priority transactions and are not limited to a particular type of transaction.

Figure 3:
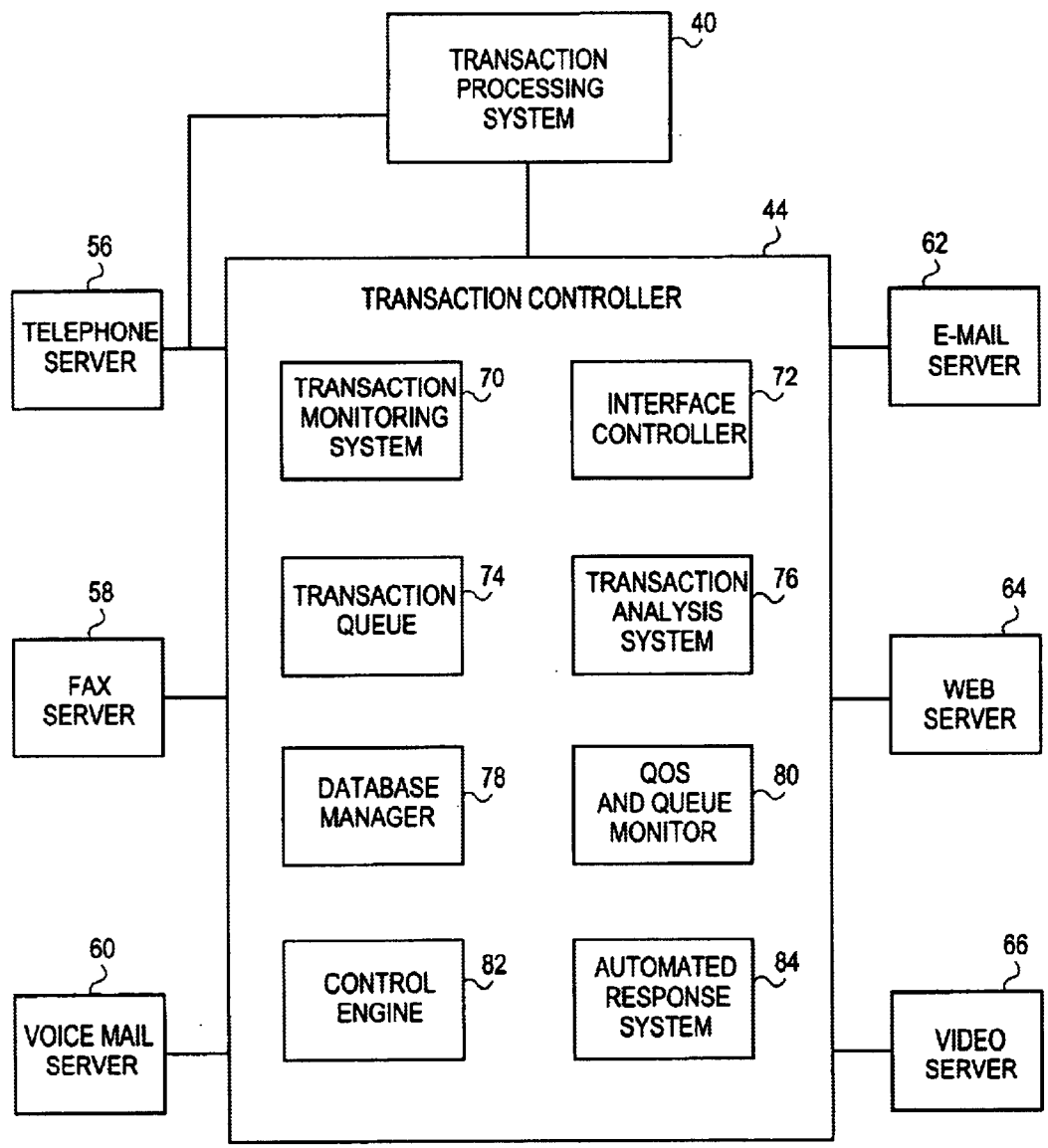
FIG. 3 illustrates an embodiment of a transaction controller capable of handling multiple types of transactions and capable of controlling multiple transaction servers.

FIG. 3 illustrates an embodiment of transaction controller 44, which is capable of handling multiple types of transactions and capable of controlling multiple transaction servers. Transaction controller 44 provides a centralized controller for handling both real-time transactions and non-real-time transactions. Embodiments of transaction controller 44 select the highest priority transaction for processing when an agent is available, regardless of the transaction type. In the embodiment of FIG. 3, transaction controller 44, transaction processing system 40, and servers 56–66 operate in the manner described above with respect to FIG. 2. As shown in FIG. 3, telephone server 56 is coupled to transaction controller 44 and transaction processing system 40. Thus, incoming telephone calls can be routed directly from telephone server 56 to transaction processing system 40 or routed to transaction controller 44. Alternatively, transaction processing system 40 may receive and transmit telephone calls directly across PSTN 42 (FIG. 2).

FIG. 3 shows direct coupling only between transaction processing system 40 and telephone server 56 (i.e., no direct coupling between any server 58–66 and transaction processing system 40). However, it will be appreciated that alternate embodiments of the invention may contain direct communication links between any server 58–66 and transaction processing system 40. Although not shown in FIG. 3, transaction processing system 40, transaction controller 44, and the various servers 56–66 are typically coupled to one or more networks, such as a PSTN, LAN, or the Internet.

Transaction controller 44 includes a transaction monitoring system 70, which monitors the overall activity of servers 56–66, transaction processing system 40, and the other modules and systems in transaction controller 44. An interface controller 72 controls the various interfaces between transaction controller 44 and other devices coupled to transaction controller 44. These interfaces include interfaces to each server 56–66, transaction processing system 40, a PSTN, a LAN, and to the Internet. A transaction queue 74 is provided for queuing various transactions handled by transaction controller 44. Although a single transaction queue 74 is illustrated in FIG. 3, a separate transaction queue may be provided for each type of transaction supported by the transaction processing system. In addition to transaction queue 74, transaction processing system 40 may include one or more transaction queues. In particular embodiments of the invention, one or more servers 56–66 also contain transaction queues.

A transaction analysis system 76 provides various analysis functions for the transactions handled by transaction controller 44. For example, transaction analysis system 76 may include an inference engine that analyzes a received e-mail message to determine the content of the message or the request contained in the message. This information is then used to route the e-mail to an appropriate agent or group of agents. Alternatively, the information may be used to automatically respond to the e-mail, as discussed below. Those of ordinary skill in the art will appreciate that various types of inference engines can be used to analyze the content of a message.

Additionally, transaction analysis system 76 may include an optical character recognition (OCR) system used to generate computer-readable text from a received fax. An inference engine may then be used to determine the content of the received fax, allowing the system to handle the fax appropriately. Transaction analysis system 76 may also use voice recognition software in combination with the inference engine to determine the content of a voice mail message. Additionally, the voice recognition software and transaction analysis system 76 may also be used to determine the content of a request or instruction spoken by a telephone caller in response to a prerecorded message.

A database manager 78 controls the storage and retrieval of information contained in a database (e.g., database 52 in FIG. 2). Database manager 78 provides a mechanism for recording various transaction processing events and generating reports describing the operation and performance of the transaction processing system. A quality of service (QOS) and queue monitor 80 monitors the QOS provided to transactions and monitors the various transaction queues (i.e., the queues contained in transaction controller 44 and/or transaction processing system 40). A control engine 82 controls the overall operation of the transaction controller and oversees the interactions between the various systems and modules contained in the transaction controller. An automated response system 84 provides a mechanism for automatically generating responses to various types of transactions.

The communication link between transaction processing system 40 and transaction controller 44 allows transaction controller 44 to communicate various information and transactions to transaction processing system 40. This information may include the types and number of transactions in the transaction queue and the QOS requirements of the queued transactions. Additionally, the communication link between transaction processing system 40 and transaction controller 44 allows transaction processing system 40 to communicate information, such as queue information and the overall load on the transaction processing system, to transaction controller 44. Transaction processing system 40 may also communicate information regarding the number of available agents, the number of scheduled agents, and other details regarding transaction processing system 40 to transaction controller 44.

In a particular embodiment of the invention, servers 56–66 communicate all incoming transactions to transaction controller 44. Transaction controller 44 then processes, and queues as necessary, the transactions. Additionally, transaction controller 44 may communicate the transactions to transaction processing system 40, depending on the priority of the transaction (e.g., QOS requirements) and the current workload of transaction processing system 40. In an alternate embodiment of the invention, each server 56–66 stores the received transactions itself, and merely notifies transaction controller 44 that a transaction was received by the server. Transaction controller 44 then provides information to the server regarding the manner in which the received transaction should be handled.

Figure 4:
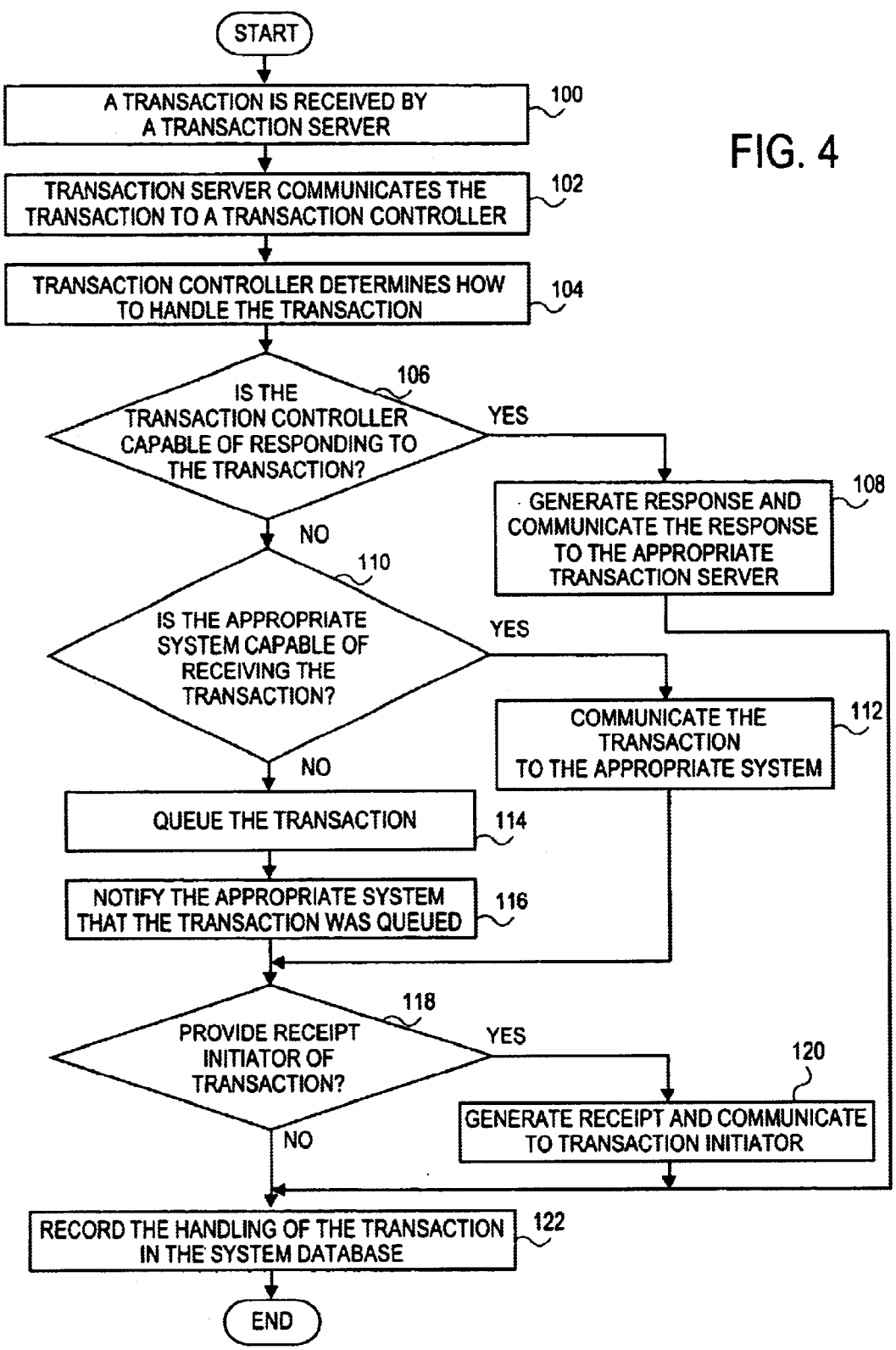
FIG. 4 is a flow diagram illustrating an embodiment of a procedure for handling received transactions.

FIG. 4 is a flow diagram illustrating an embodiment of a procedure for handling received transactions. At step 100, a transaction is received by a transaction server. At step 102, the transaction server communicates the received transaction to a transaction controller. When the transaction is communicated to the transaction controller at step 102, the transaction server may also communicate various information about the received transaction. For example, the transaction server may know the source of the transaction (e.g., the network address, telephone number, or customer name), which is provided along with the transaction to the transaction controller. At step 104, the transaction controller determines how to handle the received transaction. When determining how to handle a transaction, the transaction server that received the transaction or the transaction controller may assign a priority to the transaction. Additional details regarding the handling of received transactions are provided below.

As mentioned above with respect to FIG. 3, in one embodiment of the invention, each transaction is communicated to the transaction controller for processing. In an alternate embodiment, the transaction server that received the transaction merely notifies the transaction controller and requests information regarding the appropriate handling of the received transaction. In this alternate embodiment, the transaction server communicates information about the received transaction to the transaction controller. Thus, although the transaction controller does not actually receive the transaction, it receives information regarding the handling of the transaction (e.g., QOS requirements and the transaction source).

Step 106 determines whether the transaction controller is capable of responding to the transaction. This response would be generated automatically (e.g., by automated response system 84 in FIG. 3), and would not require any interaction with an agent. Further, the response would be generated without requiring communication with the transaction processing system. If the transaction controller is capable of responding to the transaction, then the procedure branches from step 106 to step 108, where a response is generated and communicated to the appropriate transaction server (i.e., the transaction server that received the incoming transaction). The transaction server then communicates the response to the initiator of the transaction.

If the transaction controller is not capable of responding to the transaction automatically, then the procedure continues from step 106 to step 110 to determine whether the "appropriate system" is capable of receiving the transaction. The appropriate system is the server or transaction processing system for handling the particular transaction type. For example, a transaction processing system is the appropriate system for handling a telephone call and an e-mail server is the appropriate system for handling an e-mail. The determination of whether the appropriate system is capable of receiving a transaction may be completed without actually contacting the system. For example, the transaction controller may regularly exchange information with the transaction processing system and various servers regarding the status of any queues in the transaction processing system or servers. Additionally, the transaction controller may regularly receive information regarding the current workload of the transaction processing system and servers. Thus, without actually requesting information, the transaction controller is aware of the current workload and queue status of the transaction processing environment.

If the appropriate system is capable of receiving the transaction, then the procedure branches from step 110 to step 112, where the transaction is communicated from the transaction controller to the appropriate system. In alternate embodiments that store the transaction within the appropriate server, step 112 provides a signal to the server regarding how the server should handle the transaction.

If the appropriate system is not capable of receiving the transaction in step 110, then the procedure continues to step 114, where the transaction is placed in a transaction queue. As mentioned above, a single queue may be used for all transactions, or a separate queue may be provided for each transaction type. Additionally, transaction queues may be located in the transaction controller and/or the transaction processing system. In other embodiments, a queue may be located within a server. If a particular transaction queue is located in the transaction processing system, then the transaction is communicated to the transaction processing system for queuing by that system.

At step 116, the appropriate systems are notified that the transaction was queued. In the situation where the queue is located in the transaction processing system, the procedure does not notify the transaction processing system that the transaction was queued. At step 118, the procedure determines whether to provide a receipt to the initiator of the transaction. This determination may be based on the type of transaction, the transaction initiator's identity, current system settings, the expected delay in processing the transaction, or whether the transaction initiator requested a receipt. If the procedure determines that a receipt should be provided, then the procedure branches to step 120 to generate a receipt and communicate the receipt to the transaction initiator. Otherwise, the procedure continues from step 118 to step 122 to record the handling of the transaction in the system database. This system database monitors the activity of all transactions, and is useful for monitoring overall transaction processing statistics and generating reports detailing transaction processing performance.

Figure 5:
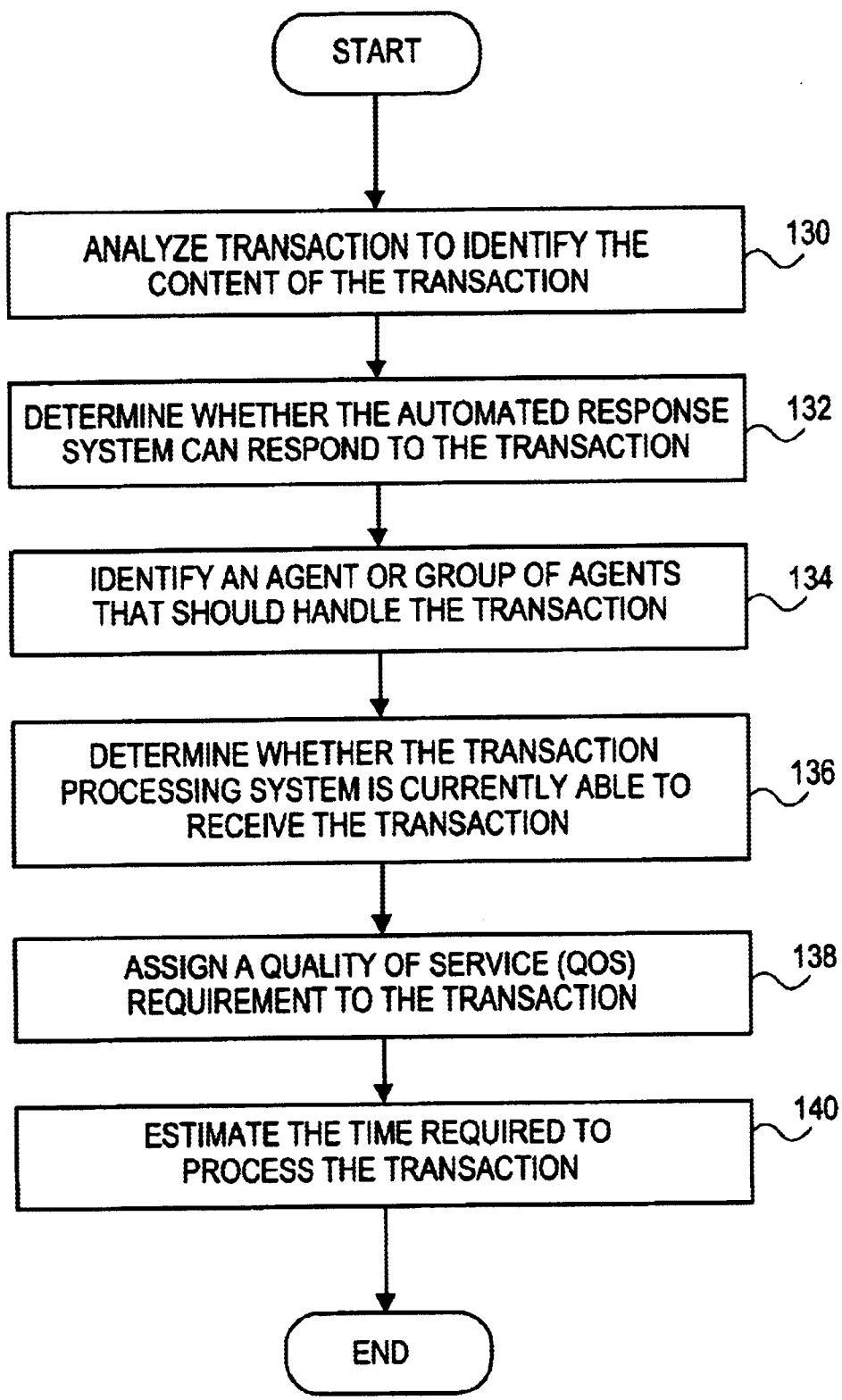
FIG. 5 is a flow diagram illustrating an embodiment of a procedure for determining how to handle a particular transaction.

FIG. 5 is a flow diagram illustrating an embodiment of a procedure for determining how to handle a particular transaction. The procedure illustrated in FIG. 5 can be performed by a transaction controller, such as transaction controller 44 in FIG. 3. At step 130, the procedure analyzes the transaction to identify the content of the transaction. Step 132 determines whether the automated response system can respond to the transaction. This automated response system is particularly useful when responding to e-mail messages, facsimiles, and when providing answers to questions and requests for information. If step 132 determines that the automated response system can respond to the transaction, then the procedure may disregard the remaining steps in FIG. 5. If the automated response cannot be generated for the transaction, then the procedure continues to step 134, where the procedure identifies an agent or group of agents that should handle the transaction.

Step 136 determines whether the transaction processing system is currently able to receive the transaction. As mentioned above, the transaction controller may receive information regarding the workload of the transaction processing system on a regular basis. If all queues in the transaction processing system or the transaction controller are full, or nearly full, the system may only accept a limited number of new transactions (e.g., only transactions having a high priority). The priority of a particular transaction may be determined by various parameters and other configuration information set by the user or administrator of the system. For example, a particular agent or group of agents may be designated as high priority, such that only incoming transactions for that agent or group of agents will be accepted by the transaction controller. Alternatively, a particular type of transaction may be designated as high priority. For example, real-time transactions such as telephone calls may be assigned a high priority, thereby rejecting all other incoming transactions until the overall workload of the transaction processing system decreases.

Step 138 of FIG. 5 assigns a QOS requirement to the transaction. QOS requirements may include the time within which a response must be generated (e.g., an e-mail response or a telephone response by an agent). This QOS requirement can be based on priorities set by the user or administrator of the system. Alternatively, the QOS requirement may be determined by the transaction initiator and communicated along with the transaction. The QOS requirement may be dynamic; i.e., based on the time of day, the day of the week, or other factors. Additionally, QOS requirements can be modified to encourage the use of a particular type of transaction. For example, the transaction processing system administrator, may provide a higher QOS requirement to e-mail transactions than to telephone calls to encourage customers to use e-mail for questions instead of telephone calls. Step 140 of FIG. 5 estimates the time required to process the transaction, such as the estimated time the transaction will remain in queue. The estimated time to process the transaction can be included in a receipt sent to the initiator of the transaction.

Figure 6:
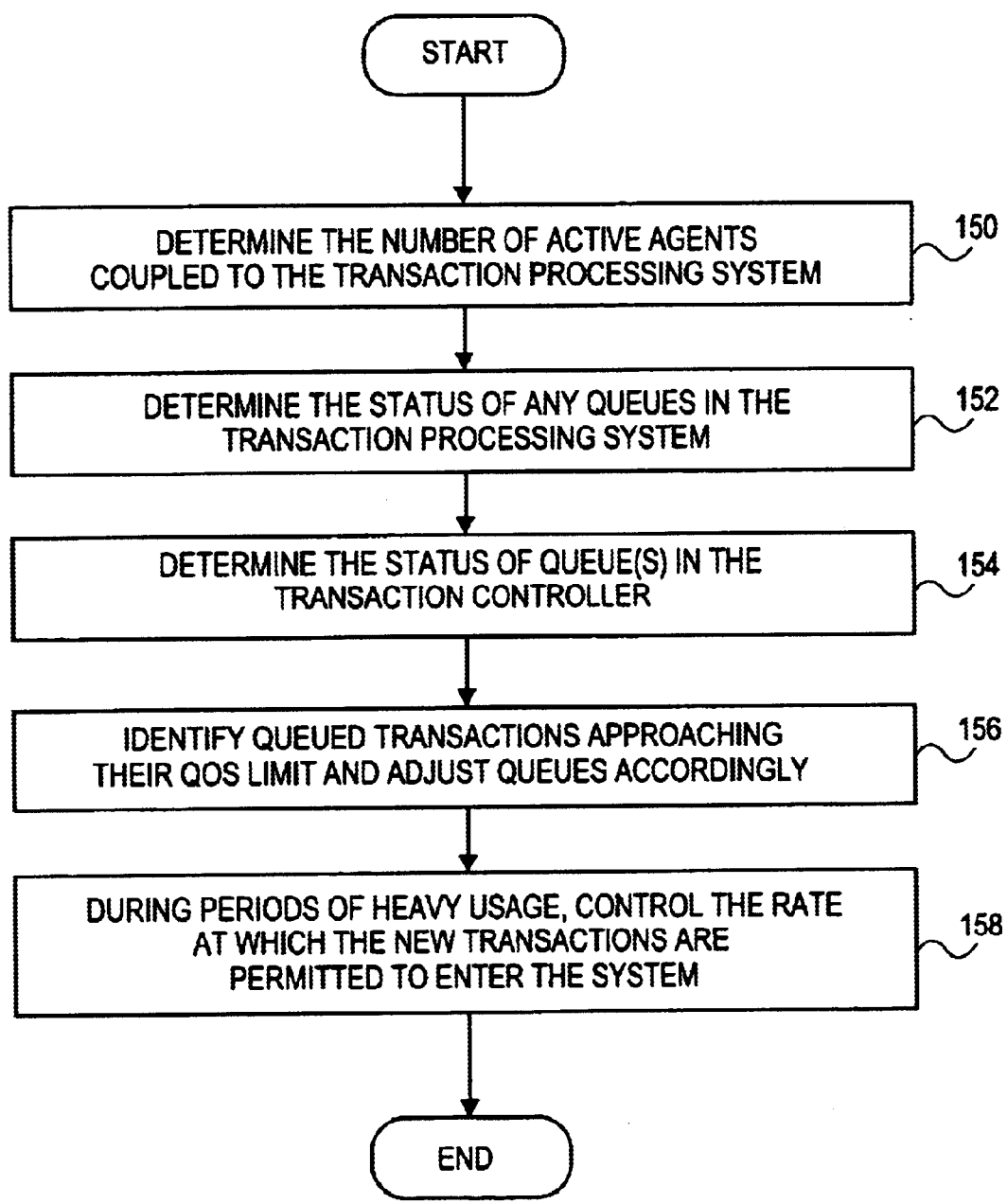
FIG. 6 is a flow diagram illustrating an embodiment of a procedure for performing various background processing operations.

FIG. 6 is a flow diagram illustrating an embodiment of a procedure for performing various background processing operations. The background processing operations discussed below may be performed at regular intervals or performed continuously (limited by available processing resources). Additionally, particular events may trigger one or more of the background processing operations shown in FIG. 6. For example, when a transaction is added to or removed from a queue, the status of the affected queue is updated. The status of agents coupled to the transaction processing system is updated each time a new agent logs into the system or an existing agent logs out of the system.

At step 150 of FIG. 6, the procedure determines the number of active agents coupled to the transaction processing system. Additionally, step 150 may determine the number of agents that are available and the number of agents that are busy. A transaction controller can determine the number of active agents by periodically requesting the information from the transaction processing system. Alternatively, the transaction processing system may regularly transmit information to the transaction controller regarding the number of active agents, the number of scheduled agents (e.g., for the next hour or two hours), current queue utilization, and the overall workload of the transaction processing system.

At step 152, the procedure determines the status of any queues in the transaction processing system. As discussed above, information regarding current queue utilization may be provided to the transaction controller from the transaction processing system. Step 154 determines the status of any queues in the transaction controller. The status of queues (e.g., queue utilization) in the transaction controller may be communicated to the transaction processing system along with QOS requirements associated with the queued transactions. Step 156 identifies queued transactions approaching their QOS limit and adjusts the queues accordingly. For example, an e-mail transaction may have a QOS requirement of generating a response within 24 hours. If the e-mail has been in queue for 23 hours, a response must be generated within one hour to avoid violating the QOS requirement. In this situation, the transaction controller may move the e-mail to the beginning of the queue or notify the transaction processing system that the transaction has an urgent handling priority.

In a particular embodiment of the invention, the transaction processing system contains a primary queue and the transaction controller contains one or more secondary queues. Thus, transactions received by the transaction controller may first be queued in a transaction queue in the transaction controller, and later communicated to the primary queue for processing by the transaction processing system. Although the primary queue is located in the transaction processing system, the transaction controller may control all queues (i.e., both the primary queue and the secondary queues) and monitor the QOS requirements of all queued transactions. The transaction controller controls the transfer of transactions from the secondary queues to the primary queue based on queue utilization information and QOS requirements of the transactions queued in both the primary queue and the secondary queue.

At step 158 of FIG. 6, during periods of heavy usage, the transaction controller controls the rate at which new transactions are permitted to enter the system. This control of the rate of accepting new transactions may be a dynamic control such that as the transaction processing system usage increases, the number of new transactions permitted to enter the system decreases. If all queues are full, the transaction controller may reject all incoming transactions until one or more queued transactions have been processed. If an incoming transaction cannot be accepted by the transaction controller, the transaction initiator may be provided with various information and options. For example, a prerecorded message may indicate that the system is unable to process the transaction and may direct the transaction initiator to leave a voice mail message. Alternatively, the transaction initiator may be provided with the organization's Internet address to retrieve information and answers to frequently asked questions.

Embodiments of the transaction controller establish a threshold for a particular transaction that triggers a particular action. For example, if a transaction has a QOS requirement that a response must be generated within 24 hours, a threshold may be set at 23 hours. Thus, if the threshold is reached without generating a response, then the transaction controller may transmit the transaction to the primary queue to ensure that a timely response is generated.

In other embodiments of the invention, the transaction controller may determine when to transfer a transaction from a secondary queue to the primary queue based on the current average time to process similar transactions. For example, if the average waiting time in the primary queue for similar transactions is ten minutes, the transaction should be moved from the secondary queue to the primary queue at least ten minutes before the transaction's QOS limit is reached. Typically, the transaction controller will transfer the transaction to the primary queue more than ten minutes before the QOS limit to allow extra processing time in the event that the transaction processing system's workload increases while the transaction is waiting in the primary queue.

Figure 7:
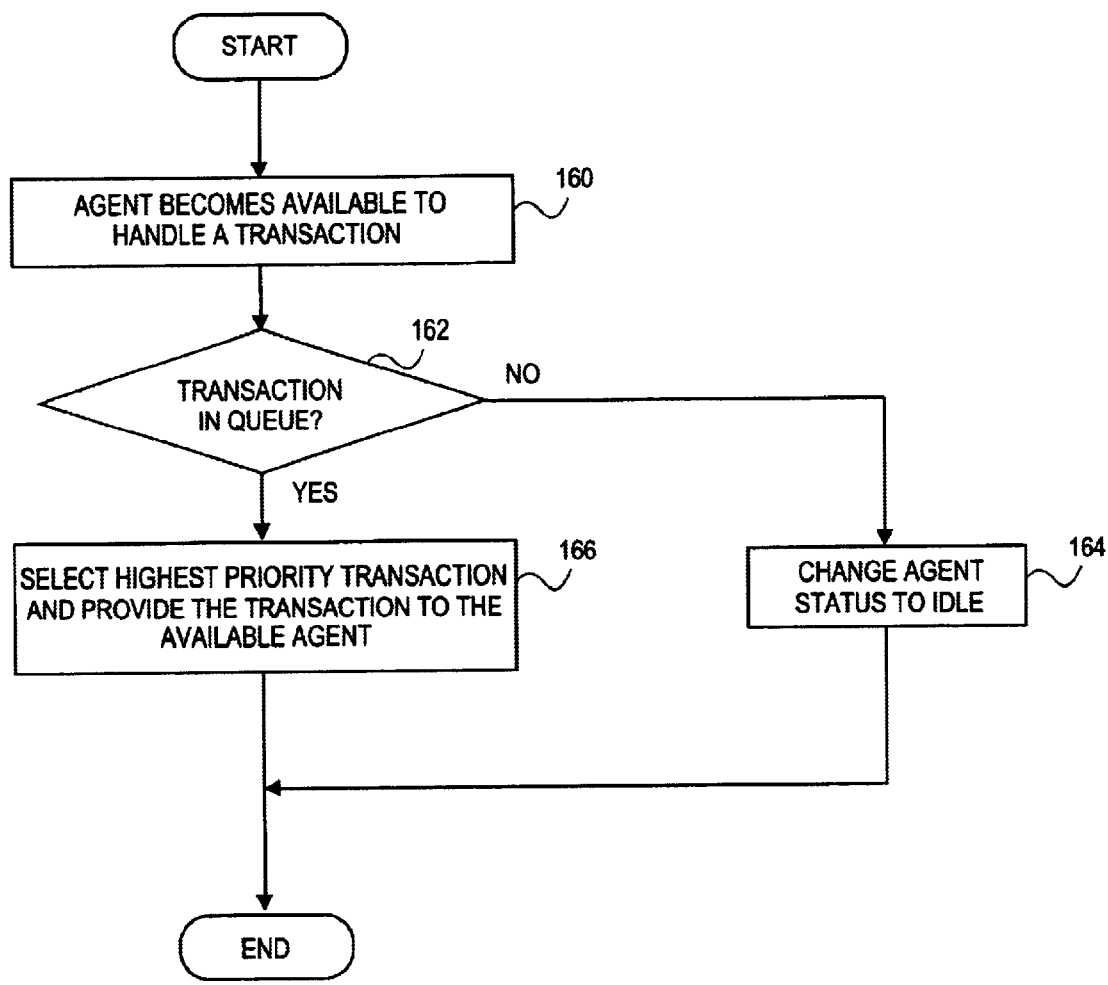
FIG. 7 is a flow diagram illustrating an embodiment of a procedure for handling an available agent.

FIG. 7 is a flow diagram illustrating an embodiment of a procedure for handling an available agent. At step 160, an agent becomes available (e.g., by logging into a transaction processing system or by completing a transaction). Step 162 determines whether any transactions have been queued. If all transaction queues are empty, then the agent's status is changed to idle. In the idle state, the agent waits for the next incoming transaction requiring agent processing. If a transaction queue contains one or more transactions, then the procedure continues from step 162 to step 166, where the procedure selects the highest priority transaction and provides the transaction to the available agent. If multiple agents become available at the same time, the procedure illustrated in FIG. 7 is performed for each available agent. The highest priority transaction may be any type of transaction that the agent is capable of handling. For example, if the agent is capable of handling both telephone calls and e-mail, then the highest priority telephone call or e-mail is provided to the agent. When the transaction is provided to the agent, any required applications are automatically invoked on the agent's system (e.g., computer). If the agent's previous transaction was a telephone call and the next transaction is an e-mail, the agent's e-mail application is automatically invoked to allow the agent's system to receive the e-mail. Thus, an agent's system is automatically prepared to handle the next transaction, without requiring the agent to manually log out of one system and log into another.

Figure 8:
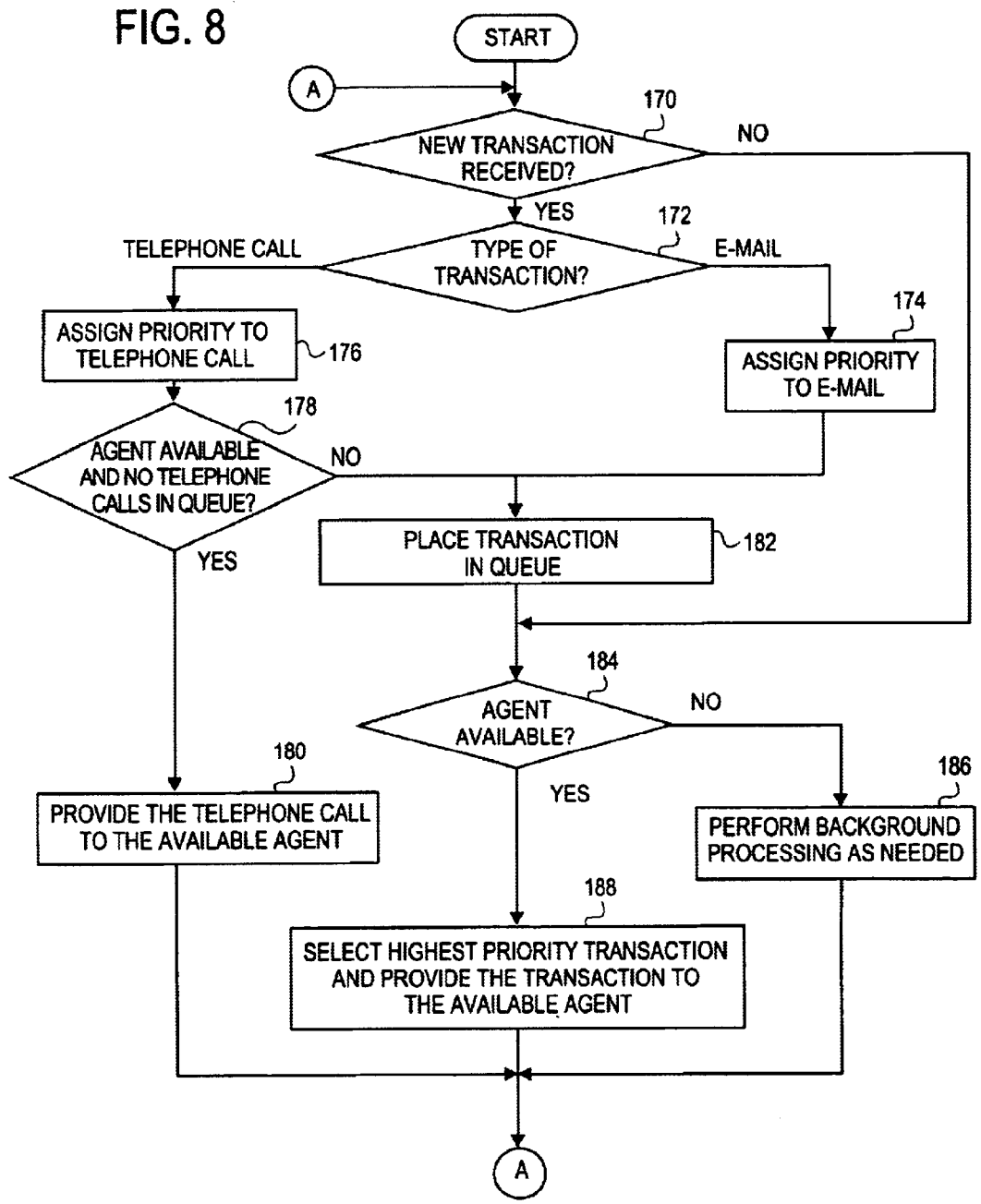
FIG. 8 is a flow diagram illustrating an embodiment of a procedure for processing telephone calls and electronic mail messages in a transaction processing system.

FIG. 8 is a flow diagram illustrating an embodiment of a procedure for processing telephone calls and e-mail messages in a transaction processing system (e.g., transaction processing system 40). The procedure of FIG. 8 generally provides a higher priority to telephone calls than e-mail messages because telephone calls are real-time transactions requiring fast responses (relative to e-mail responses). At step 170, the procedure determines whether a new transaction has been received. If not, the procedure branches to step 184 to determine whether an agent is available (e.g., to process a queued transaction).

If a new transaction is detected at step 170, then the procedure continues to step 172, which determines whether the new transaction is a telephone call or an e-mail message. If the transaction is an e-mail, then the procedure branches to step 174 where a priority is assigned to the e-mail transaction. This priority may be based, for example, on the source of the e-mail or the QOS requested by a transaction initiator or an e-mail server. The transaction is then queued at step 182.

If the transaction received is a telephone call, then the procedure branches from step 172 to step 176, where a priority is assigned to the telephone call. Step 178 determines whether an agent is available and whether the queue contains any telephone calls. If an agent is not available or the queue contains one or more telephone calls, then the procedure branches to step 182, where the telephone call is queued. If an agent is available and no telephone calls are queued, then the procedure branches from step 178 to step 180, where the telephone call is provided to an available agent.

As mentioned above, step 182 places the received transaction into a queue (e.g., a primary queue in a transaction processing system or a secondary queue in a transaction controller). The procedure then continues to step 184 to determine whether an agent is available to process a transaction. If an agent is not available, then the procedure branches to step 186 to perform various background processing tasks if necessary (e.g., the procedures discussed above in FIG. 6).

If an agent is available, then the procedure continues from step 184 to step 188, which selects the highest priority transaction and provides the transaction to the available agent. If multiple agents are available, then a transaction is selected for each available agent. The highest priority transaction is typically a telephone call because telephone calls are real-time transactions requiring faster responses than e-mail messages. However, if an e-mail is approaching its QOS limit, the e-mail may have a higher priority than all other queued transactions (including telephone calls). In this embodiment of the invention, agents are capable of handling either telephone calls or e-mails. Therefore, an available agent handles the transaction with the next highest priority, regardless of the transaction type. A particular agent may regularly switch between telephone calls and e-mails depending on the distribution of transactions in the queue. After completing step 188, the procedure returns to step 170 to determine whether a new transaction has been received.

Figure 9:
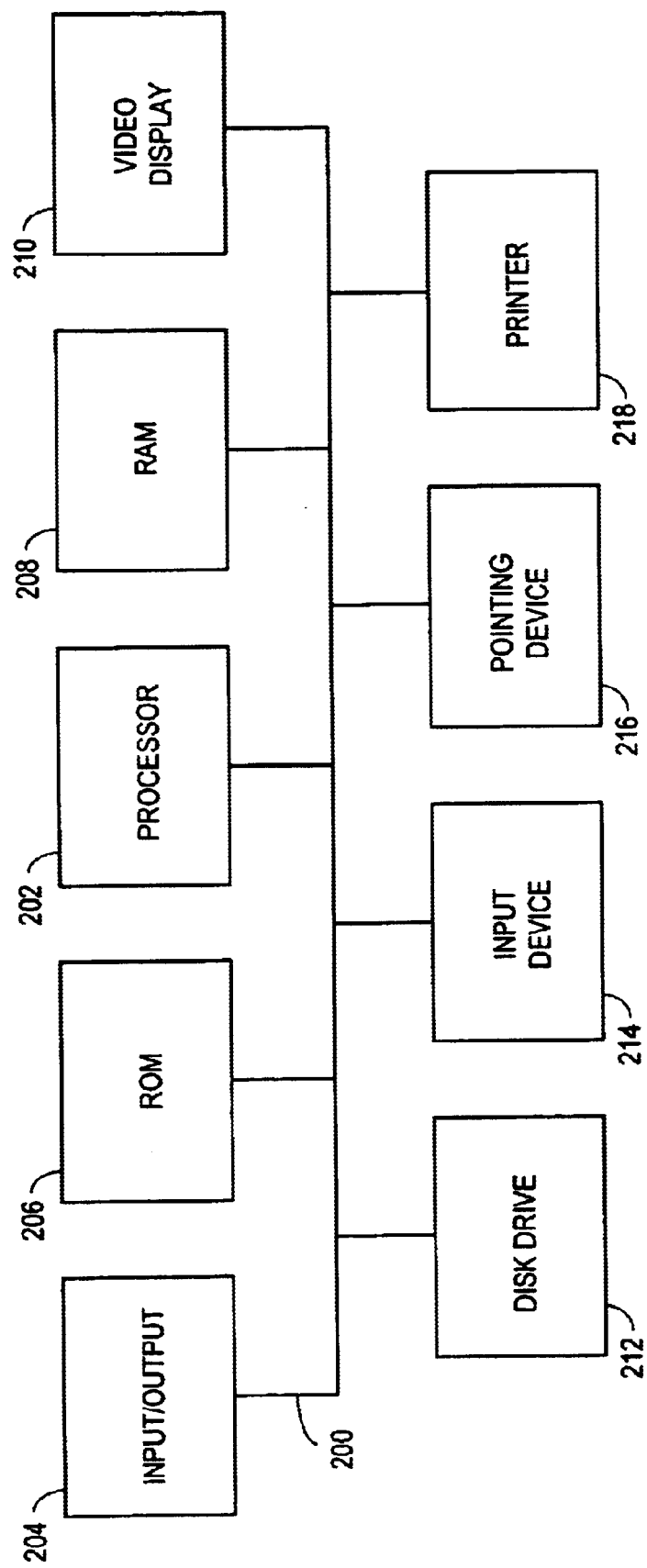
FIG. 9 illustrates an embodiment of a computer system that can be used with the present invention.

FIG. 9 illustrates an embodiment of a computer system that can be used with the present invention. For example, embodiments of the invention may use a computer of the type shown in FIG. 9 for the transaction processing system, transaction controller, servers, agent or customer computers, or any other device contained in or used with a transaction processing system. The various components in FIG. 9 are provided by way of example. Certain components of the computer in FIG. 9 can be deleted for particular implementations of the invention. The computer system shown in FIG. 9 may be any type of computer, including a general purpose computer.

FIG. 9 illustrates a system bus 200 to which various components and devices are coupled. A processor 202 performs the processing tasks required by the computer. Processor 202 may be any type of processing device capable of implementing the steps necessary to perform the various procedures and operations discussed above. An Input/Output (I/O) device 204 is coupled to bus 200 and provides a mechanism for communicating with other devices coupled to the computer. A Read-Only Memory (ROM) 206 and a Random Access Memory (RAM) 208 are coupled to bus 200 and provide a storage mechanism for various data and information used by the computer. Although ROM 206 and RAM 208 are shown coupled to bus 200, in alternate embodiments, ROM 206 and RAM 208 are coupled directly to processor 202 or coupled to a dedicated memory bus (not shown).

A video display 210 is coupled to bus 200 and displays various information and data to the user of the computer. A disk drive 212 is coupled to bus 200 and provides a mechanism for the long-term mass storage of information. An input device 214 and a pointing device 216 are also coupled to bus 200 and allow the user of the computer to enter information and commands to the computer system. Input device 214 may be, for example, a keyboard, keypad, handwriting recognition device, or voice recognition device. Pointing device 216 includes, for example, a mouse, track ball, or touch pad. A printer 218 is coupled to bus 200 and is capable of creating a hard copy of information generated by or used by the computer.

Embodiments of the present invention may be implemented using a computer-readable medium (also referred to as a processor-readable medium) containing various sets of instructions, code sequences, configuration information, and other data used by a computer or other processing device. The various information stored on the computer-readable medium is used to perform various data communication, data processing, and data handling operations, such as those described above. The computer-readable medium may be any type of magnetic, optical, or electrical storage medium including a diskette, magnetic tape, CD-ROM, memory device, or other storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of processing transactions, the method including:
   receiving a transaction from a transaction initiator, wherein the received transaction is a real-time transaction or a non-real-time transaction;
   identifying a transaction type associated with the received transaction;
   analyzing content included within the transaction;
   assigning a priority to the received transaction based on the identified transaction type, wherein a real-time transaction is assigned a higher priority than a non-real-time transaction;
   processing the received transaction using a transaction controller, the transaction controller being capable of processing both real-time transactions and non-real-time transactions and processing the transaction dependent upon the content included within the transaction and the priority of the transaction; and
   automatically responding to the transaction initiator in respect of non-real-time transactions based on the content of the transaction without interaction with an agent.

2. The method of claim 1, which includes applying optical character recognition to generate computer readable text thereby to analyze the content of the transaction.

3. The method of claim 1, in which the transaction is routed to an appropriate agent or group of agents dependent upon the content of the transaction.

4. The method of claim 1, which includes associating a Quality of Service (QOS) with the received transaction, the QOS specifying a service level threshold that, if transgressed, constitutes a violation of the QOS; and modifying the priority assigned to the received transaction to prevent a violation of the service level threshold specified by the QOS.

5. The method of claim 1, in which processing the received transaction includes, if no agents are available to process the received transaction, queuing the received transactions in at least one secondary transaction queue in the transaction controller, and selectively transferring transactions from the secondary transaction queue to a primary transaction queue of a transaction processing system.

6. The method of claim 5, in which transactions are queued in different secondary transaction queues dependent upon the transaction type.

7. The method of claim 5, which includes removing the transaction with the highest priority from the primary or secondary transaction queue when an agent becomes available to process a new transaction.

8. The method of claim 5, which includes:
   associating a Quality of Service (QOS) with the received transaction, the QOS specifying a service level threshold that, if transgressed, constitutes a violation of the QOS; and
   transferring transactions from the secondary transaction queue to the primary transaction queue based on QOS requirements of transactions in both the primary and secondary transaction queues.

9. The method of claim 5, which includes transferring a transaction from the secondary transaction queue to the primary transaction queue based on the current average time to process similar transaction types.

10. The method of claim 1, wherein the real-time transactions are selected from the group including a telephone call, a videoconference, and an Internet session.

11. The method of claim 1, wherein the non-real-time transactions are selected from the group including an electronic mail message, a voice mail message, and a facsimile transmission.

12. A transaction controller, which includes:
    a transaction monitor configured to monitor real-time transactions and non-real-time transactions received from a transaction initiator;
    a transaction analysis system for identifying a transaction type associated with the received transaction and analyzing content included within the transaction, the transaction controller assigning a priority to the received transaction based on the identified transaction type wherein a real-time transaction is assigned a higher priority than a non-real-time transaction, and processing both real-time transactions and non-real-time transactions dependent upon the content included within the transaction; and
    an automated response system to respond automatically to the transaction initiator in respect of non-real-time transactions based on the content of the transaction and without interaction with an agent.

13. The transaction controller of claim 12, which includes an interface controller coupled to the transaction monitor, the interface controller receiving transactions from a server coupled to the transaction controller.

14. The transaction controller of claim 12, which includes applying optical character recognition to generate computer readable text thereby to analyze the content of the transaction.

15. The transaction controller of claim 12, which routes the transaction to an appropriate agent or group of agents dependent upon the content of the transaction.

16. The transaction controller of claim 12, which includes:
   means for associating a Quality of Service (QOS) with the received transaction, the QOS specifying a service level threshold that, if transgressed, constitutes a violation of the QOS; and
   means for modifying the priority assigned to the received transaction to prevent a violation of the service level threshold specified by the QOS.

17. The transaction controller of claim 12, which includes a transaction processing system including a primary transaction queue, the controller including at least one secondary transaction queue, and queuing the received transaction, if no agents are available to process the received transaction, in the at least one secondary transaction queue and selectively transferring the transaction from the secondary transaction queue to the primary transaction queue.

18. The transaction controller of claim 17, in which transactions are queued in different secondary transaction queues dependent upon the transaction type.

19. The transaction controller of claim 17, in which a transaction with the highest priority is removed from the primary or secondary transaction queue when an agent becomes available to process a new transaction.

20. The transaction controller of claim 17, in which a transaction from the secondary transaction queue is transferred to the primary transaction queue based on the current average time to process similar transactions.

21. The transaction controller of claim 12, which includes:
   means for associating a Quality of Service (QOS) with the received transaction, the QOS specifying a service level threshold that, if transgressed, constitutes a violation of the QOS; and
   means for transferring transactions from the secondary transaction queue to the primary transaction queue based on QOS requirements of transactions in both the primary and secondary transaction queues.

22. The transaction controller of claim 12, in which real-time transactions are selected from the group including a telephone call, a videoconference, and an Internet session.

23. The transaction controller of claim 12, in which non-real-time transactions are selected from the group including an electronic mail message, a voice mail message, and a facsimile transmission.

24. A computer program product including a medium readable by a processor, the medium having stored thereon instructions which, when executed by the processor, cause the processor to:
   receive a transaction from a transaction initiator, wherein the received transaction is a real-time transaction or a non-real-time transaction;
   identify a transaction type associated with the received transaction;
   analyze content included within the transaction;
   assign a priority to the received transaction based on the identified transaction type, wherein a real-time transaction is assigned a higher priority than a non-real-time transaction;
   process the received transaction using a transaction controller, the transaction controller processing both real-time transactions and non-real-time transactions and processing the transaction dependent upon the content included within the transaction; and
   automatically respond to the transaction initiator in respect of non-real-time transactions based on the content of the transaction without interaction with an agent.

25. The computer program product of claim 24, in which optical character recognition is applied to generate computer readable text thereby to analyze the content of the transaction.

26. The computer program product of claim 24, in which the transaction is routed to an appropriate agent or group of agents dependent upon the content of the transaction.

27. The computer program product of claim 24, which includes:
   associating a Quality of Service (QOS) with the received transaction, the QOS specifying a service level threshold that, if transgressed, constitutes a violation of the QOS; and
   modifying the priority assigned to the received transaction to prevent a violation of the service level threshold specified by the QOS.

28. The computer program product of claim 24, in which processing the received transaction includes, if no agents are available to process the received transaction, queuing received transactions in at least one secondary transaction queue in the transaction controller, and selectively transferring transactions from the secondary transaction queue to a primary transaction queue of a transaction processing system.

29. The computer program product of claim 28, in which transactions are queued in different secondary transaction queues dependent upon the transaction type.

30. The computer program product of claim 28, which includes removing a transaction with the highest priority from the primary or secondary transaction queue when an agent becomes available to process a new transaction.

31. The computer program product of claim 28, which includes:
   associating a Quality of Service (QOS) with the received transaction, the QOS specifying a service level threshold that, if transgressed, constitutes a violation of the QOS; and
   transferring transactions from the secondary transaction queue to the primary transaction queue based on QOS requirements of transactions in both the primary and secondary transaction queues.

32. The computer program product of claim 28 which includes transferring a transaction from the secondary transaction queue to the primary transaction queue based on the current average time to process similar transactions.

33. The computer program product of claim 24, wherein the real-time transactions are selected from the group including a telephone call, a videoconference, and an Internet session.

34. The computer program product of claim 24, wherein the non-real-time transactions are selected from the group including an electronic mail message, a voice mail message, and a facsimile transmission.

* * * * *